UNITED STATES PATENT OFFICE.

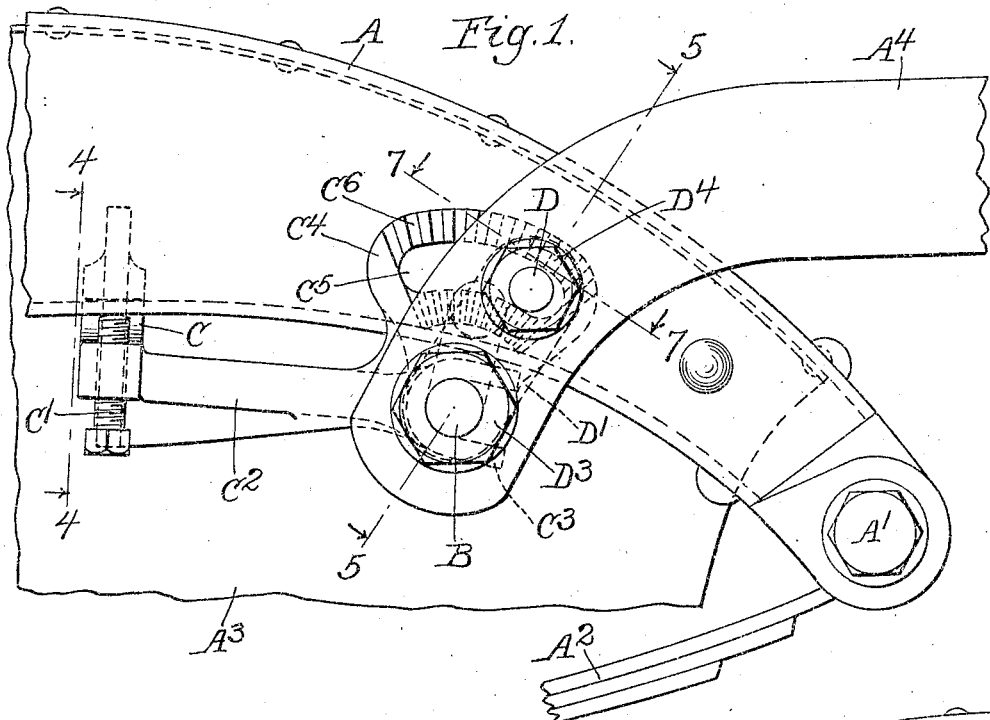
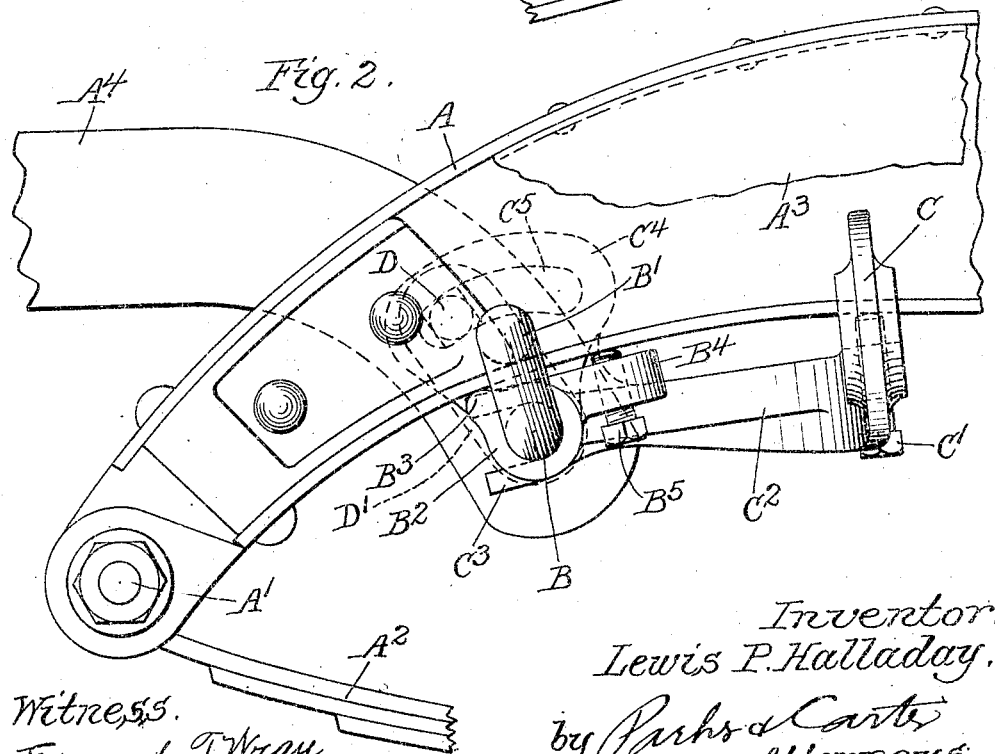

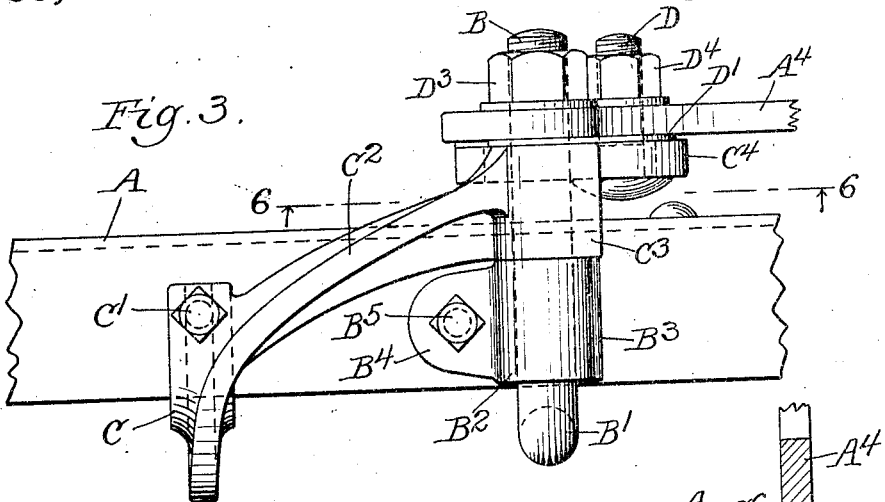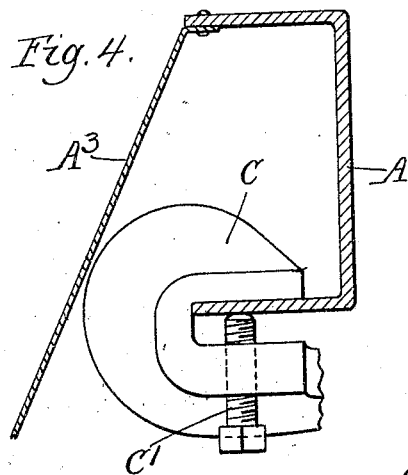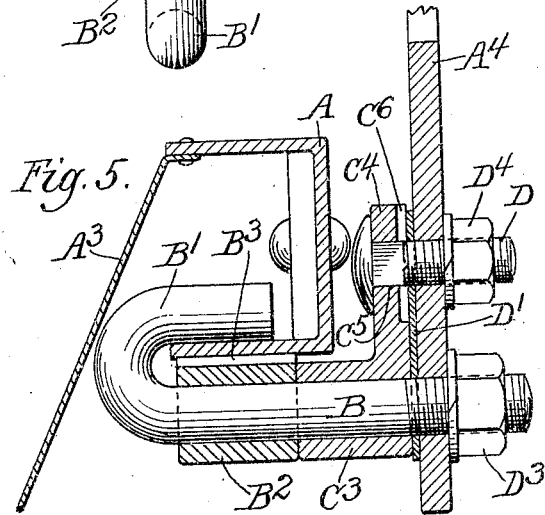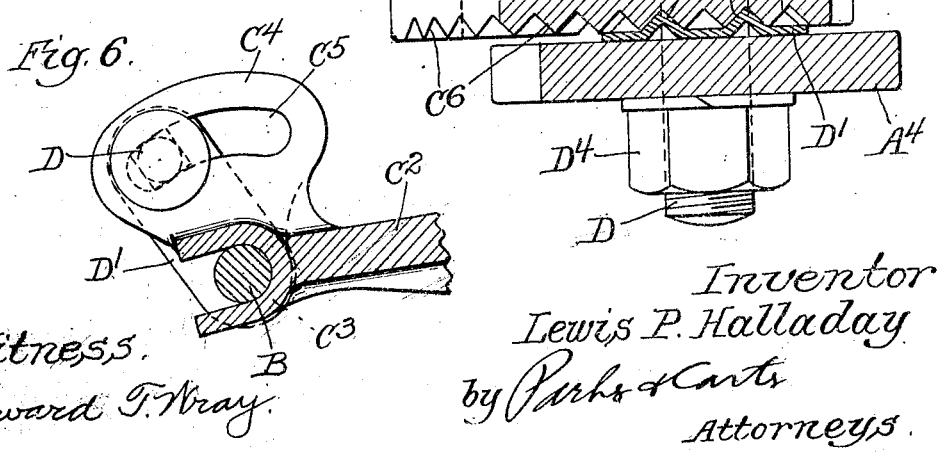

LEWIS P. HALLADAY, OF DECATUR, ILLINOIS.

BUMPER-BRACKET.

1,385,679.  Specification of Letters Patent.  Patented July 26, 1921.

Application filed March 28, 1921. Serial No. 456,333.

*To all whom it may concern:*

Be it known that I, LEWIS P. HALLADAY, a citizen of the United States, residing at Decatur, in the county of Macon and State of Illinois, have invented a certain new and useful Improvement in Bumper-Brackets, of which the following is a specification.

My invention relates to an improvement in brackets or supports for automobile bumper bars, and has for an object to provide a new and improved arrangement of support or clamp, which will be easily adapted to the frame of an automobile without interfering with the apron extending down between the frame horns in front of the radiator. Another object is to provide a form of bumper supporting clamp which will be universally adjustable for all sizes and shapes of automobile frames. Other objects will appear from time to time in the specification.

My invention is illustrated more or less diagrammatically in the accompanying drawings wherein:

Figure 1 is a side elevation, the front end of an automobile showing my bracket attached;

Fig. 2 is a side elevation, with parts omitted, of the same arrangement shown in Fig. 1 but seen from the other side;

Fig. 3 is a bottom plan view;

Fig. 4 is a section along the line 4—4 of Fig. 1;

Fig. 5 is a section along the line 5—5 of Fig. 1;

Fig. 6 is a section along the line 6—6 of Fig. 3;

Fig. 7 is a section along the line 7—7 of Fig. 1.

Like parts are indicated by like characters in all of the drawings.

A is a front end or horn of an automobile frame, $A'$ is the spring bolt and $A^2$ the spring, $A^3$ the apron extending downwardly and inwardly from the upper flange of the frame A. $A^4$ is a forwardly extending bumper supporting arm, upon which is mounted a bumper, not here shown.

B is a hook bolt terminating in a hook end $B'$, adapted to penetrate within the gap between the apron and the lower flange and to rest on the upper surface of the lower flange. $B^2$ is a sleeve mounted for rotation on the hook bolt B. It has a frame engaging fulcrum $B^3$, and a lever $B^4$. $B^5$ is a set screw threaded in the lever and adapted to engage the under side of the frame flange so that when tightened up the sleeve will be rotated about the fulcrum $B^3$, exerting tension downwardly on the hook bolt to clamp the hook bolt and sleeve rigidly in position on the flange.

C is a clamping hook adapted to pass between the apron and the edge of the flange and rest upon the upper surface of the lower flange. $C'$ is a set screw associated with this hook and adapted to clamp it tightly upon the flange as shown. $C^2$ is a spacing and positioning arm extending laterally from the plane of the clamping hook. This arm $C^2$ terminates in a slotted head or fork $C^3$, adapted to engage and straddle the hook bolt B. $C^4$ is a quadrant plate extending upwardly from the slotted head $C^3$. It contains a slot $C^5$ concentric with the center of the hook bolt, when that bolt is properly positioned within the slot, and the face of the plate adjacent the slot is corrugated as at $C^6$.

The bumper supporting bar $A^4$ has two bolt holes therethrough, as shown in Fig. 5, one of them engages the hook bolt B, the other, a locking bolt D, which also passes through the slot $C^5$. $D'$ is a locking plate pivoted on the bolt B, resting against the member $A^4$ and having a plurality of upwardly extending ribs $D^2$, adapted to engage the corrugations $C^6$. The nuts $D^3$ and $D^4$ are adapted to be tightened up on their respective bolts when the parts are in position to hold the slotted head in position on the hook bolt and to lock the plate $D'$ into engagement with the corrugations, thereby preventing angular movement of the bracket supporting bar.

It will be evident that while I have shown in my drawings an operative device, still many changes might be made both in size, shape and arrangement of parts without departing materially from the spirit of my invention, and I wish, therefore, that my drawings be regarded as in a sense diagrammatic.

The use and operation of my invention are as follows:

The operator, first, inserts the hook bolt into the narrow space between the edge of the flange and the apron, moves it up until the hook is above the flange and then rotates the hook through an angle of 90°, into the position shown in Fig. 5. He, then, slips the sleeve on the hook bolt, and tightens up the set screw to lock the sleeve and hook bolt rigidly in position on the frame.

Secondly, the operator inserts the clamping hook into the space between the flange and the apron and rotates it through an angle of 90°, into the position shown in Fig. 7, at the same time moving it up toward the hook bolt, until the slotted head on the end thereof engages the hook bolt B.

The operator then tightens up the set screw associated with the clamping hook and this holds these parts in position on the frame. He then slips the lock washer on the hook bolt, passes the short bolt through the curved slot in the quadrant plate, and slips the lock washer on that bolt also so that the corrugations on the washer engage the corrugations on the quadrant plate. He then places the bracket supporting bar in position with one perforation engaging the hook bolt, the other engaging the locking bolt. He then rotates the bracket supporting bar around the hook bolt moving the locking bolt in the quadrant slot until the bumper is at the proper elevation and then he tightens up both bolts, and thus locks the bumper supporting bar in position and holds it against rotation with respect to the supporting clamp.

I claim:

1. A clamp for automobile bumpers and the like comprising two supporting members removably in engagement with each other, and means for separately attaching them to the automobile frame, a bumper supporting arm carried by them and means for holding it against rotation with respect to them.

2. A clamp for automobile bumbers and the like comprising two supporting members removably in engagement with each other, and means for separately attaching them to the automobile frame, a bumper supporting arm carried by them and means for holding it against rotation with respect to them, and means for holding the bumper supporting arm and the two supporting members together.

3. A clamp for automobile bumpers and the like comprising two supporting members removably in engagement with each other, and means for separately attaching them to the automobile frame, a bumper supporting arm on one of them, and means associated with the other for holding the arm against rotation.

4. A clamp for automobile bumpers and the like comprising two supporting members removably in engagement with each other, and means for separately attaching them to the automobile frame, a bumper supporting arm on one of them, and means associated with the other for holding the arm against rotation, and means for holding the supporting members and the bumper supporting arm together.

5. A clamp for automobile bumpers and the like comprising a two-part supporting member, a pivot bolt upon which the two parts are rotated and a bumper supporting arm pivoted thereon, and means for separately fastening each part to the frame.

6. A clamp for automobile bumpers and the like comprising a two-part supporting member, a pivot bolt upon which the two parts are rotated and a bumper supporting arm pivoted thereon, means for separately fastening each part to the frame, and means for holding the arm against rotation.

7. A clamp for automobile bumpers and the like comprising a two-part supporting member, a pivot bolt upon which the two parts are rotated and a bumper supporting arm pivoted thereon, means for separately fastening each part to the frame, means for holding the arm against rotation and means for clamping the two parts and the supporting arm together on the bolt.

8. An automobile bumper clamp comprising a hook bolt, one arm of which is adapted to engage the flange of the automobile frame, a lever pivoted on the other arm thereof, means for rotating it to clamp it and the hook on the flange, an adjusting lever pivoted on the hook bolt and separately fastened to the frame, a bumper supporting arm pivoted on the bolt and means interposed between it and the adjusting lever for holding it against rotation.

9. An automobile bumper clamp comprising a hook bolt, one arm of which it adapted to engage the flange of the automobile frame, a lever pivoted on the other arm thereof, means for rotating it to clamp it and the hook on the flange, an adjusting lever pivoted on the hook bolt and separately fastened to the frame, a bumper supporting arm pivoted on the bolt and means interposed between it and the adjusting lever for holding it against rotation and means for separately holding the hook bolt, the lever, the bumper supporting arm, and adjusting lever in fixed position with respect to it and to the others.

10. An automobile bumper clamp comprising a hook bolt, one arm of which is adapted to engage the flange of the automobile frame, a lever pivoted on the other arm thereof, means for rotating it to clamp it and the hook on the flange, an adjusting lever pivoted on the hook bolt and separately fastened to the frame, a bumper supporting arm pivoted on the bolt and means interposed between it and the adjusting lever for holding it against rotation, a segment plate mounted on the adjusting lever, the means for holding the bumper supporting bar against rotation comprising a bolt associated with said segment plate and traveling in a slot therein, and a washer adapted to ride on said bolt and engage the corrugations on the segment plate.

11. An automobile bumper clamp comprising a hook bolt, one arm of which is adapted to engage the flange of the automobile frame, a lever pivoted on the other arm thereof, means for rotating it to clamp it and the hook on the flange, an adjusting lever pivoted on the hook bolt and separately fastened to the frame, a bumper supporting arm pivoted on the bolt and means interposed between it and the adjusting lever for holding it against rotation and means for separately holding the hook bolt, the lever, the bumper supporting arm, and adjusting lever in fixed position with respect to it and to the others, a segment plate mounted on the adjusting lever, the means for holding the bumper supporting bar against rotation comprising a bolt associated with said segment plate and traveling in a slot therein and a washer adapted to ride on said bolt and engage the corrugations on the segment plate.

12. An automobile bumper support comprising a clamp, a bumper supporting arm pivoted thereon and means associated with the clamp and separately mounted on the frame for holding the bumper bar supporting arm against rotation.

13. An automobile bumper support comprising a clamp, a bumper supporting arm pivoted thereon and means associated with the clamp and separately mounted on the frame for holding the bumper bar supporting arm against rotation, said means comprising a hook and means for fastening it on the frame, a lever associated therewith having a quadrant plate adjacent the clamp and means for locking the bumper supporting arm and the plate together.

14. An automobile bumper clamp comprising a hook bolt, one arm of which is adapted to engage the flange of an automobile, a lever pivoted on the other arm and means for rotating it to clamp the frame between it and the hook, a separate clamping hook adapted to engage the frame at a point removed from the hook bolt, a lever associated therewith having a slotted member to engage the hook bolt, a bumper supporting arm associated with the hook bolt and means associated with the slot member for holding it against rotation.

15. An automobile bumper clamp comprising a hook bolt, one arm of which is adapted to engage the flange of an automobile, a lever pivoted on the other arm and means for rotating it to clamp the frame between it and the hook, a separate clamping hook adapted to engage the frame at a point removed from the hook bolt, a lever associated therewith having a slotted member to engage the hook bolt, a bumper supporting arm associated with the hook bolt, and means associated with the slot member for holding it against rotation, said means comprising a quadrant plate having a segment slot and a corrugated surface, and a bolt passing through the bumper supporting arm engaging said slot and a corrugated washer thereon engaging the corrugations on the quadrant plate.

16. An automobile bumper clamp comprising a hook bolt, one arm of which is adapted to engage the flange of an automobile, a lever pivoted on the other arm and means for rotating it to clamp the frame between it and the hook, a separate clamping hook adapted to engage the frame at a point removed from the hook bolt, a lever associated therewith having a slotted member to engage the hook bolt, a bumper supporting arm associated with the hook bolt and means associated with the slot member for holding it against rotation, a set screw associated with the hook adapted to lock it in position on the flange.

17. An automobile bumper clamp comprising a hook bolt, one arm of which is adapted to engage the flange of an automobile, a lever pivoted on the other arm and means for rotating it to clamp the frame between it and the hook, a separate clamping hook adapted to engage the frame at a point removed from the hook bolt, a lever associated therewith having a slotted member to engage the hook bolt, a bumper supporting arm associated with the hook bolt, and means associated with the slot member for holding it against rotation, said means comprising a quadrant plate having a segment slot and a corrugated surface, and a bolt passing through the bumper supporting arm engaging said slot and a corrugated washer thereon engaging the corrugations on the quadrant plate, a set screw associated with the hook adapted to lock it in position on the flange.

18. A clamp for vehicle bumpers and the like comprising a hook bolt adapted to encircle the frame flange and means for locking the bolt in position, a clamping jaw adapted to inclose the frame flange and means for locking it in position, a slotted arm extending from said jaw adapted to inclose a portion of the hook bolt, and means mounted on the hook bolt and engaging the arm for supporting the vehicle bumper.

19. A clamp for automobile bumpers and the like, comprising a primary supporting member, a bumper arm pivoted thereto, means for securing said member to the automobile frame, a second supporting member and separate means for securing it to the frame, and means for preventing rotation of the bumper arm on the primary supporting member, comprising means for securing it to said second member.

20. A clamp for automobile bumpers and the like comprising a primary supporting member, a bumper arm pivoted thereto, means for securing said primary member to the automobile frame, a second supporting member and separate means for securing it to said frame, said second securing means adapted removably to engage said primary means and means for preventing rotation of the bumper arm upon said primary means, comprising means for securing it to said second supporting means.

Signed at Chicago, county of Cook, and State of Illinois, this 19 day of March, 1921.

LEWIS P. HALLADAY.